United States Patent [19]
Primeaux, II

[11] Patent Number: 5,317,076
[45] Date of Patent: May 31, 1994

[54] POLYUREA ELASTOMER WITH REDUCED MOISTURE VAPOR TRANSMISSION

[75] Inventor: Dudley J. Primeaux, II, Elgin, Tex.

[73] Assignee: Texaco Chemical Co., White Plains, N.Y.

[21] Appl. No.: 45,150

[22] Filed: Apr. 12, 1993

[51] Int. Cl.$^5$ .................... C08G 18/50; C08G 18/65
[52] U.S. Cl. .................................. 528/61; 528/60; 528/67; 528/68; 525/131
[58] Field of Search .............. 528/60, 61, 67, 68; 525/131

[56] References Cited

U.S. PATENT DOCUMENTS

| | | | |
|---|---|---|---|
| 3,236,895 | 2/1966 | Lee et al. | 528/60 |
| 4,722,989 | 2/1988 | Starner et al. | 528/64 |
| 4,732,919 | 3/1988 | Grigsby, Jr. et al. | 528/60 |
| 4,743,672 | 5/1988 | Goel | 528/60 |
| 4,745,170 | 5/1988 | Bushman et al. | 528/61 |
| 5,013,813 | 5/1991 | Zimmerman et al. | 528/60 |
| 5,106,874 | 4/1992 | Porter et al. | 528/64 |
| 5,106,935 | 4/1992 | Grigsby, Jr. et al. | 528/61 |
| 5,124,426 | 6/1992 | Primeaux, II et al. | 528/68 |
| 5,171,819 | 12/1992 | Su et al. | 528/60 |
| 5,189,073 | 2/1993 | Humbert et al. | 528/68 |
| 5,189,075 | 2/1993 | Zimmerman et al. | 528/60 |
| 5,218,005 | 6/1993 | Zimmerman et al. | 528/60 |
| 5,219,973 | 6/1993 | Slack et al. | 528/61 |
| 5,239,041 | 8/1993 | Grigsby, Jr. et al. | 528/60 |
| 5,266,671 | 11/1993 | Primeaux, II | 528/60 |

*Primary Examiner*—John Kight, III
*Assistant Examiner*—Rabon Sergent
*Attorney, Agent, or Firm*—George J. Darsa; Christopher Nicastri

[57] ABSTRACT

A polyurea elastomer which exhibits a reduced moisture transfer rate is disclosed. The elastomer includes an isocyanate, an amine terminated 1,2-polyoxybutylene diol and a chain extender. The isocyanate is preferably a quasiprepolymer of an isocyanate and a material selected from at least one polyol, a high molecular weight polyoxyalkyleneamine or a combination thereof.

18 Claims, No Drawings

POLYUREA ELASTOMER WITH REDUCED MOISTURE VAPOR TRANSMISSION

BACKGROUND OF THE INVENTION

1. Field of the Invention

The present invention relates generally to polyurea elastomers and, more specifically, to spray and reaction injection molded polyurea elastomers which exhibit reduced moisture vapor transmission.

2. Description of Background Art

Elastomer systems are commonly recognized as, among other things, coating materials, with spray polyurea elastomer systems being particularly useful when employed in this capacity; rooftops and floorings are particularly well suited substrates. In addition to coating applications, spray polyurea elastomers are also employed in other open mold spraying applications for part production. Polyurea elastomers are also used for part production in closed mold applications, such as reaction injection molding (RIM) and reinforced reaction injection molding (RRIM).

There are many applications where it is desirable to employ a coating material which will resist the transmission of water. For example, substrates like steel and concrete will experience less corrosion when coated by a spray polyurea elastomer with a reduced moisture vapor transmission rate; landfills can be lined with a polyurea elastomer barrier film exhibiting a reduced moisture vapor transmission rate to reduce or prevent moisture penetration which can cause leaching of materials from the landfill; and environments which require low humidity can be lined with such a polyurea elastomer. In these coating applications, a prime consideration is the rate at which the spray polyurea elastomer coating will transmit moisture vapor. A polyurea elastomer with a higher moisture vapor transmission rate will not provide the corrosion protection or prevention of leaching which is required by these applications. Such a failure can not be tolerated in an environmentally sensitive application.

In accordance with the present invention the moisture vapor transmission of a polyurea elastomer is substantially reduced, thereby overcoming those shortcomings identified above.

SUMMARY OF THE INVENTION

Accordingly, the present invention relates to a polyurea elastomer which comprises an (A) component and a (B) component. The (A) component includes an isocyanate. Preferably, the isocyanate of component (A) includes a quasi-prepolymer of an isocyanate and a material selected from at least one polyol, a high molecular weight polyoxyalkyleneamine or a combination of these materials. The (B) component includes (1) an aminated 1,2-polyoxybutylene diol and (2) a chain extender.

Advantageously, the polyurea elastomer of the present invention, due to the inclusion of the aminated 1,2-polyoxybutylene diol component, exhibits a reduced moisture vapor transmission rate relative to polyurea elastomers which are formulated without this component. Thus, a spray polyurea elastomer of the present invention can be used in applications which demand reduced moisture vapor transmission, such as an anticorrosion coating or an environmental containment barrier.

DETAILED DESCRIPTION OF THE INVENTION

The isocyanates employed in component (A) are those known to one skilled in the art. Thus, for instance, they can include aliphatic isocyanates of the type described in U.S. Pat. No. 4,748,192. Accordingly, these aliphatic isocyanates are typically diisocyanates and, more particularly, are the trimerized or the biuretic form of an aliphatic diisocyanate, such as hexamethylene diisocyanate, or the bifunctional monomer of the tetraalkyl xylene diisocyanate, such as the tetramethyl xylene diisocyanate. Cyclohexane diisocyanate is also to be considered a preferred aliphatic isocyanate. Other useful aliphatic polyisocyanates are described in U.S. Pat. No. 4,705,814. They include aliphatic diisocyanates, for example, alkylene diisocyanates with 4 to 12 carbon atoms in the alkylene radical, such as 1,12-dodecane diisocyanate and 1,4-tetramethylene diisocyanate. Also described are cycloaliphatic diisocyanates, such as 1,3 and 1,4-cyclohexane diisocyanate as well as any desired mixture of these isomers, 1-isocyanato-3,3,5-trimethyl-5-isocyanatomethylcyclohexane (isophorone diisocyanate); 4,4'-,2,2'- and 2,4'-dicyclohexylmethane diisocyanate as well as the corresponding isomer mixtures, and the like.

A wide variety of aromatic polyisocyanates are preferred to form the polyurea elastomer of the present invention. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-iso-cyanatophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162; and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to about 100 weight percent diphenyldiisocyanate isomers, of which about 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979.

By far the most preferred aromatic polyisocyanate is methylene bis(4-phenylisocyanate) or MDI. Pure MDI, quasi-prepolymers of MDI, and modified pure MDI, etc. are useful. Materials of this type may be used to prepare suitable elastomers. Since pure MDI is a solid and, thus, inconvenient to use, liquid products based on MDI or methylene bis(4-phenylisocyanate) are used herein. U.S. Pat. No. 3,394,164 described a liquid MDI product. More generally, uretonimine modified pure MDI is included also. This product is made by heating pure distilled MDI in the presence of a catalyst. The liquid product is a mixture of pure MDI and modified MDI and is represented as follows:

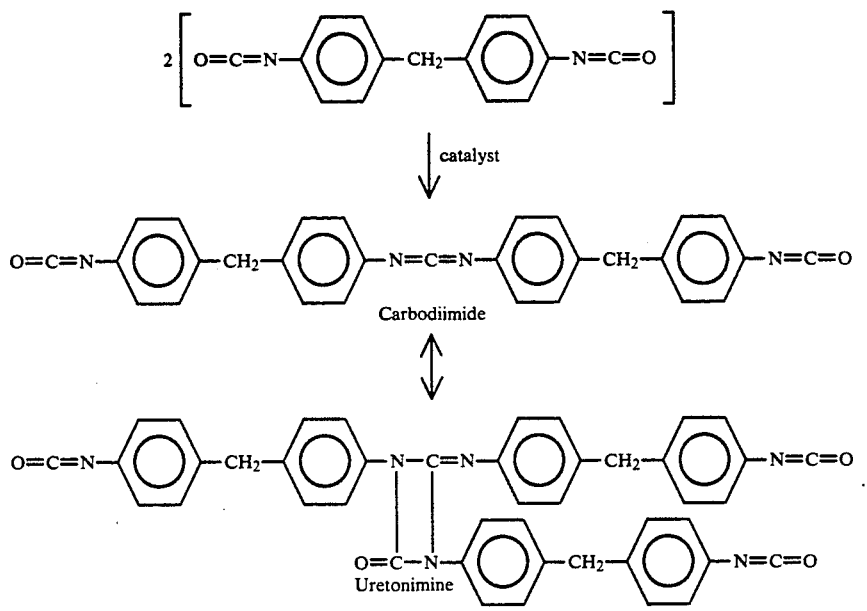

Examples of commercial materials of this type are ISONATE® 125M (pure MDI) and ISONATE 143L, RUBINATE® LF-168, and RUBINATE LF-209 ("liquid" MDI's). The ISONATE's are products of Dow Chemical and the RUBINATE's are products of ICI Polyurethanes. Preferably, the amount of isocyanates used is the stoichiometric amount based on all the ingredients in the formulation or greater than the stoichiometric amount.

Of course, the term isocyanate also includes quasi-prepolymers of isocyanates or polyisocyanates with active hydrogen containing materials. The active hydrogen containing materials of component (A) can include, but are not limited to, a polyol or polyols, a high molecular weight polyoxyalkyleneamine or combinations thereof. An example is ICI Polyurethane's RUBINATE® 9015 which comprises an isocyanate quasi-prepolymer prepared from a modified MDI and a polyoxyalkylene polyol.

The polyols include polyether polyols, polyester diols, triols, tetrols, etc., having an equivalent weight of at least about 500, and preferably at least about 1,000 up to about 3,000. Those polyether polyols based on trihydric initiators of about 4,000 molecular weight and above are especially preferred. The polyethers may be prepared from ethylene oxide, propylene oxide, butylene oxide or mixtures of propylene oxide, butylene oxide and/or ethylene oxide. Other high molecular weight polyols which may be useful in this invention are polyesters of hydroxyl terminated rubbers, e.g., hydroxyl terminated polybutadiene. Hydroxyl terminated quasi-prepolymers of polyols and isocyanates are also useful in this invention.

Especially preferred are amine terminated polyether polyols, including primary and secondary amine terminated polyether polyols of greater than 1,500 average molecular weight having from about 2 to about 6 functionality, preferably from about 2 to about 3, and an amine equivalent weight of from about 750 to about 4,000. Mixtures of amine terminated polyethers may be used. In a preferred embodiment the amine terminated polyethers have an average molecular weight of at least about 2,500. These materials may be made by various methods known in the art.

The amine terminated polyether resins useful in this invention, for example, are polyether resins made from an appropriate initiator to which lower alkylene oxides, such as ethylene oxide, propylene oxide, butylene oxide or mixtures thereof are added with the resulting hydroxyl terminated polyol then being aminated.

When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, in a preferred embodiment, the amine terminated polyether resins useful in this invention have greater than 50 percent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated by known techniques, for example, as described in U.S. Pat. No. 3,654,370, the contents of which is incorporated herein by reference.

In the practice of this invention, a single high molecular weight amine terminated polyols, may be used. Also, mixtures of high molecular weight amine terminated polyols, such as mixtures of di- and trifunctional materials and/or different molecular weight or different chemical composition materials, may be used.

Also, high molecular weight amine terminated polyethers or simply polyether amines may be included in component (A) and may be used alone or in combination with the aforestated polyols. The term high molecular weight is intended to include polyether amines having a molecular weight of at least about 2000. Particularly preferred are the JEFFAMINE ® series of polyether amines available from Texaco Chemical Company; they include JEFFAMINE D-2000, JEFFAMINE D-4000, JEFFAMINE T-3000 and JEFFAMINE T-5000. These polyether amines are described with particularly in Texaco Chemical Company's product brochure entitled THE JEFFAMINE POLYOXYALKYLENEAMINES.

The (B) component of the present polyurea elastomer system includes an aminated 1,2-polyoxybutylene diol and a chain extender. The aminated 1,2-polyoxybutylene diol can be prepared in any known or yet to be discovered manner. Generally, a 1,2-polyoxybutylene diol is directly aminated to produce an amine terminated 1,2-polyoxybutylene diol, represented by the formula:

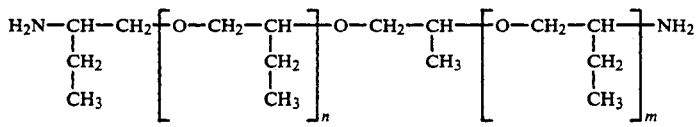

where n is a number from about 0 to about 75 and m is a number from about 1 to about 75. In a preferred embodiment, the sum of n+m is a number between about 1 and about 75. It is preferable that the amine terminated 1,2-polyoxybutylene diol be terminated with primary amine groups, although the present invention does include amine terminated 1,2-polyoxybutylene diols having one or both secondary amine terminating groups. Primary amine terminated 1,2-polyoxybutylene diols are preferred because, among other things, they provide a product with better thermal stability and better hydrolytic stability.

One particularly preferred way of preparing the aminated 1,2-polyoxybutylene diol is by reacting a 1,2-polyoxybutylene diol with ammonia in a hydrogen atmosphere and in the presence of a nickel-copper-chromium-molybdenum catalyst at a temperature of about 170° C. This reaction can be performed, for instance, by passing the 1,2-polyoxybutylene diol, ammonia and hydrogen through a tubular reactor which contains the catalyst. The crude reaction product is then stripped to remove the ammonia and water to produce the amine terminated 1,2-polyoxybutylene diol. The 1,2-polyoxybutylene diols used to prepare the amine terminated 1,2-polyoxybutylene diol can be selected from 1,2-polyoxybutylene diols having a molecular weight of between about 200 to about 11,000, and preferably up to about 6000. One particularly preferred 1,2-polyoxybutylene diol is available from the Dow Chemical Company under the name VORANOL ™ B-2004. VORANOL ™ B-2004 has a weight average molecular weight of about 1900 to about 2150, with an average of about 2000.

By incorporating the aminated 1,2-polyoxybutylene diol into the present polyurea elastomer, a reduced moisture vapor transmission is observed, which results in the characteristic reduced permeability to water. Without intending to limit the scope of the invention in any manner, Applicant theorizes that the reduced moisture vapor transmission is due to the high degree of hydrophobicity of the 1,2-polyoxybutylene chain.

The chain extenders useful in this invention include, for example, 1-methyl-3,5-diethyl-2,4-diaminobenzene, 1-methyl-3,5-diethyl-2,6-diaminobenzene (both of these materials are also called diethyltoluene diamine or DETDA and are commercially available as ETHACURE ® 100 from the Ethyl Corporation, Baton Rouge, La.), 1,3,5-triethyl-2,6-diaminobenzene, 3,5,3',5'-tetraethyl-4,4'-diaminodiphenylmethane and the like. Particularly preferred aromatic diamine chain extenders are 1-methyl-3,5-diethyl-2,4-diaminobenzene or a mixture of this compound with 1-methyl-3,5-diethyl-2,6-diaminobenzene. It is within the scope of this invention to include some aliphatic chain extender materials as described in U.S. Pat. Nos. 4,246,363 and 4,269,945.

Other chain extenders include di(methylthio)-toluene diamine or N,N'-bis(t-butyl) ethylenediamine, each of which can be used alone or, preferably, in combination with 1-methyl-3,5-diethyl-2,4-diaminobenzene or 1-methyl-3,5-diethyl-2,6-diaminobenzene. The aforestated combination includes from about 20 to about 99 parts of di(methylthio)-toluene diamine or N,N'-bis(t-butyl) ethylenediamine to about 80 to about 1 parts of DETDA.

One particularly preferred form of the di(methylthio)-toluene diamine component of the chain extender is as Ethacure ® 300, a product of Ethyl Corporation. Specifically, Ethacure 300 is a 4:1 blend of 3,5-di(methylthio)-2,4-toluene diamine and 3,5 di(methylthio)-2,6-toluene diamine, respectively. The N,N'-bis(t-butyl) ethylenediamine component is commercially available from Virginia Chemicals, Portsmouth, Va.

Other chain extenders include amine terminated chain extenders which are generally described as low molecular weight poly-oxyalkylene polyamines containing terminal amine groups. One particular chain extender is represented by the formula:

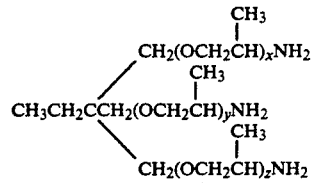

wherein x+y+z has a value of up to about 6.3. The average molecular weight is up to about 500 and the product is commercially available from Texaco Chemical Company as JEFFAMINE T-403.

Another related polyoxypropylene chain extender is represented by the formula:

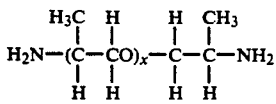

wherein x has a value of up to about 8.3. This product has an average molecular weight of up to about 500 and is commercially available from Texaco Chemical Company as JEFFAMINE D-400. The product having the same formula as above wherein x has an average value of up to about 4.9 is useful. This product has an average molecular weight of up to about 300 and is commercially available from Texaco Chemical Company as JEFFAMINE D-230.

Other chain extenders will be apparent to those skilled in the art and the above recitation is not intended to a be a limitation on the invention claimed herein.

Optionally, the present polyurea elastomer can include an internal mold release agent to facilitate the removal of the cured elastomer from the open or closed mold. While the release agent, if employed, can be incorporated into the (A) or (B) component, it is preferably incorporated in the (B) component. The internal mold release agents useful in the present invention are known to those skilled in the art; they include, but are not limited to, zinc stearate, sodium oleate and silicone agents.

Advantageously, the (A) and (B) components react to form the present elastomer system without the aid of a catalyst.

Other conventional formulation ingredients may be employed in component (A) or (B) as needed, such as, for example, foam stabilizers, also known as silicone oils or emulsifiers. The foam stabilizers may be an organic silane or siloxane. For example, compounds may be used having the formula:

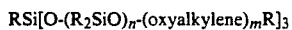

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Pigments, for example titanium dioxide, may be incorporated in the elastomer system, preferably in the (B) component, to impart color properties to the elastomer. Similarly, filler materials may also be included in the present polyurea elastomer.

Post curing of the elastomer of the invention is optional. Post curing will improve some elastomeric properties, such as heat sag. Employment of post curing depends on the desired properties of the end product.

The (A) component and (B) component of the present polyurea elastomer system are combined or mixed under high pressure; most preferably, they are impingement mixed directly in the high pressure equipment, which is, for example, a GUSMER® H-2000 plural component proportioning unit fitted with a GUSMER Model GX-7 spray gun where open mold work or coating is desired or, where closed mold work is desired (e.g., RIM or RRIM), the proportioner can be fitted with standard RIM or RRIM equipment. In particular, a first and second pressurized stream of components (A) and (B), respectively, are delivered from two separate chambers of the proportioner and are impacted or impinged upon each other at high velocity to effectuate an intimate mixing of the two components and, thus, the formation of the elastomer system, which is then delivered onto or into the desired substrate via the spray gun or RIM equipment. If desired, the present polyurea elastomer can be used for pour gun work, such as electrical potting work, and when used in this capacity, the high pressure equipment can be fitted, for example, with a GUSMER ARC pour gun.

The volumetric ratio of the (A) component to the (B) component is generally from about 30 to 70 percent to about 70 to 30 percent. Preferably, the volumetric ratio is about 1:1.

GLOSSARY OF TERMS AND MATERIALS

ETHACURE® 100-Diethyltoluene diamine; a product of the Ethyl Corporation.

ISONATE® 143 L-Carbodiimide modified liquid MDI; a product of the Dow Chemical Company.

JEFFAMINE® T-5000-Polypropylene oxide triamine of about 5000 molecular weight; a product of Texaco Chemical Company.

JEFFAMINE® D-2000-Polypropylene oxide diamine of about 2000 molecular weight; a product of Texaco Chemical Company.

JEFFAMINE® BD-2004-Aminated 1,2-polyoxybutylene diol of about 2000 molecular weight; a product of Texaco Chemical Company.

RUBINATE® LF-168-Carbodiimide modified liquid MDI; a product of ICI Polyurethanes.

RUBINATE® LF-209-Carbodiimide modified liquid MDI; a product of ICI Polyurethanes.

RUBINATE TM 9015-An isocyanate quasi-prepolymer; a product of ICI Polyurethanes

The following examples are provided to further illustrate preferred embodiments of the present invention and should not be construed as limiting the present invention in any way.

In the examples, all spray work was performed with a GUSMER® H-2000 plural component proportioning unit, fitted with a GUSMER model GX-7 impingement spray gun. The elastomer systems were sprayed using a block temperature of 150° F. for both components, with a hose temperature of 150° F. The system output was 20 lbs/min with a line pressure ranging from 1500 to 2000 psi static, 1200 to 1500 psi working pressure. The aminated 1,2-polyoxybutylene diol component used in Examples 2 and 4 is an aminated 1,2-polyoxybutylene diol of about 2000 weight average molecular weight having a primary amine value of 1.037 meq/g, a total amine value of 1.045 meq/g and a total acetylatables value of 1.12 meq/g. All parts are by weight unless otherwise specified.

EXAMPLE I

The (A) component of a spray polyurea elastomer comprised a quasi-prepolymer, RUBINATE 9015. The (B) component was prepared by combining 34.9 parts of JEFFAMINE T-5000, 34.9 parts of JEFFAMINE D-2000, and 30.2 parts of DETDA. The (A) and (B) components were mixed in the high pressure, high temperature impingement mix spray equipment, at an (A):(B) weight ratio of 1.14 and a volumetric ratio of 1.00. The resulting polyurea elastomer was sprayed onto a flat metal substrate coated with a sodium oleate based external mold release agent. The spray polyurea elastomer system had an effective gel time of 2.5 seconds.

EXAMPLE II

The (A) component of a spray polyurea elastomer comprised a quasi-prepolymer, RUBINATE 9015. The (B) component was prepared by combining 34.85 parts of JEFFAMINE T-5000, 34.85 parts of JEFFAMINE BD-2004, and 30.3 parts of DETDA. The (A) and (B) components were mixed in the high pressure, high temperature impingement mix spray equipment, at an (A):(B) weight ratio of 1.16 and a volumetric ratio of 1.00. The resulting polyurea elastomer was sprayed onto a flat metal substrate coated with a sodium oleate based external mold release agent. The spray polyurea elastomer system had an effective gel time of 3.2 seconds.

EXAMPLE III

The (A) component of a spray polyurea elastomer comprised a quasi-prepolymer, RUBINATE 9015. The (B) component was prepared by combining 71.1 parts of JEFFAMINE D-2000, and 28.9 parts of DETDA. The (A) and (B) components were mixed in the high pressure, high temperature impingement mix spray equipment, at an (A):(B) weight ratio of 1.15 and a volumetric ratio of 1.00. The resulting polyurea elastomer was sprayed onto a flat metal substrate coated with a sodium oleate based external mold release agent. The spray polyurea elastomer system had an effective gel time of 2.0 seconds.

EXAMPLE IV

The (A) component of a spray polyurea elastomer comprised a quasi-prepolymer, RUBINATE 9015. The (B) component was prepared by combining 70.9 parts of JEFFAMINE BD-2004, and 29.1 parts of DETDA. The (A) and (B) components were mixed in the high pressure, high temperature impingement mix spray equipment, at an (A):(B) weight ratio of 1.16 and a volumetric ratio of 1.00. The resulting polyurea elastomer was sprayed onto a flat metal substrate coated with a sodium oleate based external mold release agent. The spray polyurea elastomer system had an effective gel time of 2.7 seconds.

| Example No. | I | II | III | IV |
|---|---|---|---|---|
| Resin Blends | | | | |
| JEFFAMINE T-5000 | 34.9 | 34.85 | — | — |
| JEFFAMINE D-2000 | 34.9 | — | 71.1 | — |
| JEFFAMINE BD-2004 | — | 34.85 | — | 70.9 |
| DETDA | 30.2 | 30.3 | 28.9 | 29.1 |
| Processing | | | | |
| Index | 1.05 | 1.05 | 1.05 | 1.05 |
| Iso/Res Volume ratio | 1.00 | 1.00 | 1.00 | 1.00 |
| Iso/Res Weight ratio | 1.14 | 1.16 | 1.15 | 1.17 |
| Effective Gel Time, sec | 2.5 | 3.2 | 2.0 | 2.7 |
| Elastomer Physical Properties | | | | |
| Tensile strength, psi | 1704 | 1853 | 1828 | 1728 |
| Elongation, % | 171 | 143 | 215 | 122 |
| Tear strength, pli | 389 | 390 | 390 | 380 |
| Shore D Hardness, 0 sec | 52 | 50 | 51 | 51 |
| 100% Modulus, psi | 1468 | 1661 | 1418 | 1634 |
| Moisture Vapor Transmission, perms at 30 dry mils | 0.042 | 0.022 | 0.033 | 0.019 |

As these data demonstrate, the polyurea elastomers of the present invention, which include the aminated 1,2-polyoxybutylene diol (Examples II and IV) exhibit moisture vapor transmissions that are about 47 and 42 percent less, respectively, than those exhibited by polyurea elastomers that are devoid of the aminated 1,2-polyoxybutylene diol (Examples I and III).

I claim:

1. A polyurea elastomer comprising the reaction product of an (A) component which includes an isocyanate and a (B) component which includes (1) an aminated 1,2-polyoxybutylene diol and (2) a chain extender.

2. The polyurea elastomer of claim 1 wherein the aminated 1,2-polyoxybutylene diol is terminated with primary amine groups and has a molecular weight of about 200 to about 11,000.

3. The polyurea elastomer of claim 1 wherein the aminated 1,2-polyoxybutylene diol is terminated with primary amine groups and has a molecular weight of about 200 to about 6000.

4. The polyurea elastomer of claim 1 wherein the aminated 1,2-polyoxybutylene diol is terminated with primary amine groups and has a molecular weight of about 1900 to about 2200.

5. The polyurea elastomer of claim 1 wherein the isocyanate of component (A) comprises a quasi-prepolymer of an isocyanate and a material selected from at least one polyol, a high molecular weight polyoxyalkyleneamine or a combination of these materials.

6. The polyurea elastomer of claim 5 wherein the polyol comprises polyether polyols or polyester polyols having an equivalent weight of at least about 500.

7. The elastomer of claim 6 wherein the polyester polyols are polyesters of hydroxyl terminated rubbers.

8. The elastomer of claim 6 wherein the polyether polyols are selected from the group consisting of polyols based on trihydric initiators and having a molecular weight of at least about 4000; amine terminated polyether polyols having an average molecular weight greater than 1500, a functionality of from about 2 to about 6 and an amine equivalent weight of from about 750 to about 4000; and mixtures thereof.

9. The elastomer of claim 8 wherein the functionality of the polyether polyols is from about 2 to about 3.

10. The elastomer of claim 6 wherein the polyether polyols are derived from amine terminated polyether resins having greater than 50 percent of their active hydrogens in the form of amine hydrogens.

11. The elastomer of claim 1 wherein the chain extender is selected from a compound represented by the formula:

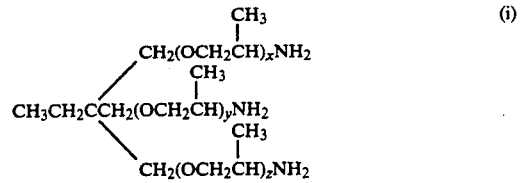

wherein x+y+z has a value of up to about 6.3 and wherein the average molecular weight is up to about 500;

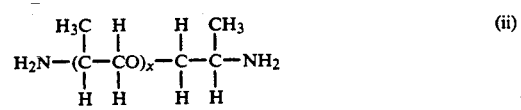

wherein x has a value of up to about 8.3 and wherein the average molecular weight is up to about 500; or (iii) a combination of compounds (i) and (ii).

12. The elastomer of claim 1 wherein the chain extender is selected from the group consisting of 1-methyl-3,5-diethyl-2,4-diaminobenzene; 1-methyl-3,5-diethyl-2,6-diaminobenzene; a mixture of 1-methyl-3,5-diethyl-2,4-diaminobenzene and 1-methyl-3,5 diethyl-2,6-diaminobenzene; di(methylthio)-toluene diamine; N′,N-bis(t-butyl) ethylene diamine; 1,3,5-triethyl-2,6-diaminobenzene; and 3,5,3′,5′-tetraethyl-4,4′-diaminodiphenylmethane.

13. The elastomer of claim 1 wherein the volumetric ratio of the (A) component to the (B) component is from about 30 to about 70 percent of the (A) component to about 70 to about 30 percent of the (B) component.

14. The elastomer of claim 1 further comprising a mold release agent.

15. A polyurea elastomer comprising the reaction product of an (A) component which includes a quasi-prepolymer of an isocyanate and a material selected from at least one polyol, a high molecular weight polyoxyalkyleneamine or a combination of said materials; and a (B) component which includes (1) a primary amine terminated 1,2-polyoxybutylene diol with a molecular weight of about 200 to about 11,000, and (2) a chain extender.

16. The elastomer of claim 15 wherein the primary amine terminated 1,2-polyoxybutylene diol has a molecular weight of about 200 to about 6000.

17. The elastomer of claim 15 wherein the primary amine terminated 1,2-polyoxybutylene diol has a molecular weight of about 1900 to about 2200.

18. The elastomer of claim 15 wherein said chain extender is selected from the group consisting of:

a) 1-methyl-3,5-diethyl-2,4-diaminobenzene;
b) 1-methyl-3,5-diethyl-2,6-diaminobenzene;
c) a mixture of 1-methyl-3,5-diethyl-2,4-diaminobenzene and 1-methyl 3,5-diethyl-2,6-diaminobenzene;
d) di(methylthio)toluene diamine;
e) N,N′-bis(t-butyl) ethylenediamine;
f) 1,3,5-triethyl-2,6-diaminobenzene;
g) 3,5,3′,5′-tetraethyl-4,4′-diaminodiphenylmethane;
h)

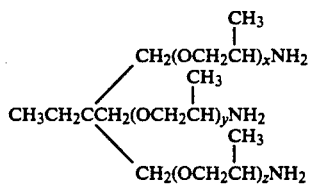

wherein x+y+z has a value of up to about 6.3 and wherein the average molecular weight is about 500;

i)

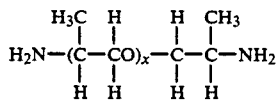

wherein x has a value of up to about 8.3 and wherein the average molecular weight is up to about 500; or j) a combination of two or more of compounds (a)–(i).

* * * * *